(12) United States Patent
Takayasu

(10) Patent No.: US 6,410,164 B1
(45) Date of Patent: Jun. 25, 2002

(54) ANTIFOULING MEMBER AND PROCESS FOR PRODUCING THE SAME

(75) Inventor: Teruki Takayasu, Nara (JP)

(73) Assignee: Showa Co., Ltd., Nara (JP)

( * ) Notice: Subject to any disclaimer, the term of this patent is extended or adjusted under 35 U.S.C. 154(b) by 0 days.

(21) Appl. No.: 09/623,990

(22) PCT Filed: Aug. 6, 1998

(86) PCT No.: PCT/JP98/03512

§ 371 (c)(1),
(2), (4) Date: Sep. 12, 2000

(87) PCT Pub. No.: WO99/65675

PCT Pub. Date: Dec. 23, 1999

(30) Foreign Application Priority Data

Jun. 17, 1998 (JP) .......................................... 10-185720

(51) Int. Cl.7 .............................................. B32B 15/01
(52) U.S. Cl. ........................ 428/660; 428/469; 428/699; 148/269; 148/273
(58) Field of Search ................................ 148/269, 273; 928/660, 469, 697, 699

(56) References Cited

U.S. PATENT DOCUMENTS 3,661,742 A * 5/1972 Osborn et al. .............. 204/147
3,949,122 A * 4/1976 Lepetit et al. .............. 427/229

FOREIGN PATENT DOCUMENTS

| JP | 55-112190 | | 8/1980 |
| JP | 56-124327 | | 9/1981 |
| JP | 58-167798 | | 10/1983 |
| JP | 63-137629 | | 6/1988 |
| JP | 1-120237 | | 12/1989 |
| JP | 4-208455 | | 7/1992 |
| JP | 07-109208 A | * | 4/1995 |

* cited by examiner

Primary Examiner—John Sheehan
Assistant Examiner—Andrew L. Oltmans
(74) Attorney, Agent, or Firm—Wenderoth, Lind & Ponack, L.L.P.

(57) ABSTRACT

An antifouling member comprising a highly corrosion-resistant metal comprising titanium, zirconium, tantalum, niobium, or an alloy based on any of these metals and, deposited thereon, a coating layer of silver or a silver alloy so as to have a bonding strength as high as at least 0.2 MPa. The member can be prevented from marine organisms attaching thereto.

15 Claims, No Drawings

ANTIFOULING MEMBER AND PROCESS FOR PRODUCING THE SAME

TECHNICAL FIELD

The present invention relates to a material for preventing marine organisms deposition on marine arrangements such as ships, marine structures and marine facilities, and a production process for the same.

BACKGROUND ART

Deposition of marine organisms such as barnacles on marine arrangements including ships provides such troubles in terms of navigation as a reduction in the velocity due to an increase in the frictional resistance and brings about such various problems that it is unfavorable in terms of good appearance as well as functional problems that marine arrangements such as ships are corroded.

In these cases, taken is a measure to apply paint called antifouling paint to inhibit marine organisms deposition.

A mechanism of inhibiting marine organisms deposition by the above antifouling paint depends on dissolution of harmful metal. For example, a metal dissolution amount required for inhibiting barnacles deposition is 2 μg per one square cm a day in the case of tin compounds and 16 μg in the case of copper compounds.

As described above, antifouling paints blended with effective tin compounds have too strong toxicity and therefore the production thereof has been discontinued in 1997 in our country. Paints blended with copper compounds having toxicity, which is not so serious as those of tin compounds, are produced even at present and cause marine pollution.

In overseas countries such as France, Great Britain and U.S.A. other than our country, they are controlled in use because of too strong toxicity thereof. Paints of copper compounds which are alternate products thereof are used but have unsatisfactory effects, and therefore the existing state is that tin compounds-blended products having a strong toxicity are used as well to bring about serious marine pollution.

Worked out is a technique in which high corrosion resistant metal comprising titanium, zirconium, tantalum, niobium and alloy containing these metals as principal components is used without using the above antifouling paints to inhibit marine organisms deposition (Japanese Patent Application Laid-Open No. 109208/1995). However, depositing amounts of marine organisms are changed to a large extent due to a seasonal factor that barnacles of marine organisms are liable to deposit from early summer through autumn excluding some cold current species thereof, a regional factor of whether or not parrot fishes and black porgies which take barnacles for feeds are present and a factor of whether or not organic and inorganic nutrients are rich, which is a condition liable to cause the formation of a biological membrane by marine microorganisms which is said to be closely related to the deposition of marine organisms. Further, in marine organisms such as barnacles, larvae of barnacles are liable to deposit on ships which are operated at a lower frequency or parts which have less friction with sea water during running. Under the preceding conditions which are preferable for the deposition of marine organisms, the above technique disclosed in Japanese Patent Application Laid-Open No. 109208/1995 is not sufficiently effective and firm, and has had the defect that the deposition, which is not serious, of marine organisms is caused.

Further, techniques making use of silver having excellent antibacterial and bactericidal effects are disclosed in Japanese Patent Application Laid-Open No. 124327/1981, Japanese Patent Application Laid-Open No. 167798/1983, Japanese Patent Application Laid-Open No. 137629/1988 and Japanese Patent Application Laid-Open No. 120237/1989.

However, these patent techniques are techniques in which silver powder is blended into synthetic resin materials, aluminum porous anodic oxide membranes or rubber substrates to inhibit marine organisms deposition by the action of silver ions dissolved from this silver powder, and therefore there has been the problem that considering the strength and the cost of the materials, not only the mixing amount of the silver powder is restricted but also almost all silver powder is buried into the insides thereof to make it impossible to expect the sufficient effects.

Further, the base materials are synthetic resin materials and rubber substrates having low surface hardnesses, and therefore they have been restricted in use for marine arrangements such as ships to which particularly an abrasion resistance is required.

In using antifouling paints for preventing marine organisms deposition, there has been the problem that harmful metal ions are dissolved in the ocean to exert an adverse effect on the global environment.

Further, in using only high corrosion resistant metal comprising titanium, zirconium, tantalum, niobium and alloy containing these metals as principal components, it has been restricted in use under such severe condition as described above.

Furthermore, the techniques making use of silver powder having excellent antibacterial and bactericidal effects have involved, as described above, the problems that the blending amount is restricted and that almost all silver powder is buried and the defect that they can not be used for uses in which an abrasion resistance is required.

In light of the existing state described above, the present inventors shall provide a material which not only has no possibility to contaminate the ocean and is excellent in terms of good appearance but also is excellent in an abrasion resistance and can stably inhibit marine organisms deposition over a long period of time, and a production process for the same.

DISCLOSURE OF THE INVENTION

The present inventors experimented high corrosion resistant metal comprising titanium, zirconium, tantalum, niobium or alloy containing these metals as principal components which was developed previously under a condition in which marine organisms such as barnacles were liable to deposit to find that the deposition of marine organisms was caused.

Then, they have developed a material which can maintain an effect under a severe condition as well over a long period of time. The details thereof shall be described below with reference to experiment examples.

BEST MODE FOR CARRYING OUT THE INVENTION

Experiment Example 1

First, an experiment using a material obtained by blending silver powder into a synthetic resin material was carried out. To specifically describe, a thermoplastic ABS resin was used for the synthetic resin to prepare a plate into which 1% of silver powder having a particle diameter of several tum was blended. An FRP plate or a titanium plate was used for a control example. A plate of length 30 cm×width 30 cm×thickness 3 mm was used for the respective samples.

The results thereof are shown in Table-1. The sample in which the silver powder was blended had a poorer effect than that of the titanium plate.

TABLE 1

Deposition state of marine organisms when using various materials

| Samples used | | After 30 days | After 60 days | After 90 days |
|---|---|---|---|---|
| Silver-blended resin plate | Comparative Example 1 | Δ | Δ | X |
| Titanium plate | Comparative Example 2 | ○ | ○ | ○ |
| FRP plate | Comparative Example 3 | Δ | X | X |

Deposition state of marine organisms such as barnacles:
- ○: partially observed
- Δ: observed over the whole surface but firm deposition on the substrate was not observed
- X: observed over the whole surface, and deposition thereof was penetrated firmly into the substrate As shown by this result, the technique in which silver powder having an antibacterial property and/or a bactericidal property was blended into the synthetic resin material could not display so much effect since the silver powder was buried into the inside and little silver powder was present on the surface which was brought into contact with seawater.

Further, the substrate into which the silver powder was blended was a synthetic resin having a low surface hardness, and therefore barnacles were penetrated firmly into the substrate, so that an improvement in the effect was not observed at all.

Experiment Example 2

Then, coating treatment in electroplating was carried out as a technique for fixing a material of silver having an effect on a surface.

Iron which was an inexpensive and conventional material was used for base metal.

The plating method is a conventional method which has so far been used, but a bonding strength between the iron substrate and the silver coating showed a strength of 0.2 MPa or more. However, before dipping in seawater, only immersing in brine of 3.5% which is a seawater concentration for mere 2 to 3 weeks peeled off the silver coating on the surface and corroded iron of the base metal.

This is a phenomenon which has been caused since iron used for the base material is corroded under a severe corrosive environment of brine.

It has been found from this knowledge that a material suited as base metal is restricted only to the above high corrosion resistant metal comprising titanium, zirconium, tantalum, niobium and alloy containing these metals as principal components which is a material not only showing a very high abrasion resistance even under a severe corrosive environment of seawater but also capable of inhibiting marine organisms such as barnacles deposition in itself.

Experiment Example 3

Then, a material treated by a method of conventional electroplating and PVD which was a general coating treating method which has so far been used was prepared on the above high corrosion resistant metal to investigate if marine organisms deposited on this material.

A titanium material which was one example of the above high corrosion resistant metal was used for the base metal. A plate having a dimension of length 30 cm×width 30 cm×thickness 3 mm was used for this titanium material.

TABLE 2

Deposition state of marine organisms when using various materials

| Coating treating method | | Bonding strength (Mpa) | After 30 days | After 60 days | After 90 days |
|---|---|---|---|---|---|
| Electro-plating | Comparative Example 4 | 0.01 | ◎ | ○ | ○ |
| PVD | Comparative Example 5 | 0.01 | ◎ | ○ | ○ |
| Non-treated titanium material | Comparative Example 2 | — | ○ | ○ | ○ |

Deposition State of Marine Organisms such as Barnacles
- ◎: maintained was a state that deposition was not observed at all over the whole surface (deposition of vegetative organisms was observed, but they could be removed by simple operation)
- ○: partially observed As shown in Table-2, the materials coated with silver inhibit marine organisms deposition as compared with the non-treated titanium material.

However, the effects are lost soon, and no difference from the non-treated material is observed. This is considered due to that titanium metal has a very stable passive film on a surface under an ordinary state and therefore a coating having a large bonding strength of 0.2 MPa or more can not be obtained in a coating treating technique which has so far been carried out and that peeling of the silver coating is brought about and as a result thereof, an improvement in the effect has not been observed so much.

Experiment Example 4

Then, various coating conditions and coating methods were repeatedly investigated for a treating method in which a high bonding strength of 0.2 MPa or more can be maintained between the above high abrasion resistant metal containing the above titanium metal and silver or silver alloy. This investigation shall specifically be described below.

The coating treating method is composed of four stage processes of a defatting process, an etching process, a coating treating process and an after-treating process.

If fat matters remain on the metal surface, the subsequent coating treatment can not be carried out, and therefore it has to be immersed in an organic solvent for several hours to completely decompose and remove the fat matters. Also in this defatting process, employed was a method in which a titanium material was dipped in an organic solvent for 2 to 3 hours at a room temperature to completely remove fat matters on the titanium metal surface.

As shown in Experiment Example 3, an etching process is a process for removing a passive film present on the titanium surface which shows high corrosion resistant. A hydrofluoric acid solution was used for removing this passive film. To be more specific, a titanium plate of length 30 cm×width 30 cm×thickness 3 mm was dipped in a 5% hydrofluoric acid solution at a room temperature for 5 minutes to remove the passive film composed of an oxide which was formed on the titanium metal surface.

Next, various coating treatments were carried out. The following methods other than a conventional electroplating method for a silver coating were tried for the coating treating method.

1. Electroplating of silver alloy:

For the purpose of aiming at an improvement in chemical and mechanical characteristics which were not observed in pure silver, a silver-palladium alloy coating was provided by a method in which palladium chloride was mixed in a plating bath.

2. Chemical plating:

In this plating method, a direct current power source was not used. Coating treatment was carried out by a method in which a reducing agent such as hydrazine and the like was used.

3. Heat decomposition method (coat-plating):

Coating treatment was carried out by a method in which a compound solution containing silver was coated on a titanium substrate and then heated.

4. Clad:

Coating treatment was carried out by a cold welding method in which heating was not used.

Also in the electroplating process, the current density, the plating bath temperature, the current running time and the plating bath composition were changed to try to carry out coating treatment, whereby materials having various coating thicknesses were prepared. However, even if any of the coating treating processes was employed, the high bonding strength of 0.2 MPa or more between the titanium substrate and the silver coating could not be obtained, so that peeling of the silver coating was caused in the seawater, and as a result thereof, an improvement in the effect was not observed.

Next, the after-treating process was investigated. This after-treating process shall specifically be described below. In order to allow the titanium substrate to be connected to the coated silver coating at a high bonding strength, a process of alloying treatment was employed so that titanium metal was connected to the coated silver coating via a diffusion layer. First, heat treatment was carried out at various temperatures and durations under an ambient atmosphere. To be specific, the heat treatment was carried out at 400° C., 500° C., 600° C. and 700° C. for 30 minutes, 60 minutes and 120 minutes 30 respectively.

However, materials having a high bonding strength of 0.2 MPa or more between the titanium substrate and the silver coating could not be prepared.

Next, heat treatment was carried out under a non-oxidation atmosphere of argon gas, nitrogen gas or a vacuum atmosphere under the same conditions as those under an ambient atmosphere. To be specific, the heat treatment was carried out at 400° C., 500° C., 600° C. and 700° C. for 30 minutes, 60 minutes and 120 minutes respectively to find that the materials subjected to heat treatment at 500° C. or higher showed a high bonding strength of 0.2 MPa or more between the titanium substrate and the silver coating and that the materials subjected to heat treatment at 600° C. or higher showed a higher bonding strength of 0.4 MPa or more.

It was difficult to observe the silver diffusion layers of the materials having a high bonding strength even under a microscope, but as a result, a value of 0.2 MPa or more was shown.

The materials having a bonding strength of 0.2 MPa or more did not cause peeling of the silver coating as well in the seawater, and therefore as a result thereof, they showed a stable and excellent effect over a long period of time.

When the materials obtained by using any of the coating treating methods described above were used in this heat diffusion treatment under a non-oxidation atmosphere, they showed resultingly a high value of 0.2 MPa or more by allowing titanium metal to be connected to the silver coating via a diffusion layer.

The materials subjected to the alloying treatment of the heat diffusion treatment were subjected to processing so as to be provided with a smooth surface by a method such as roll-rolling, whereby irregular surfaces on which barnacles were liable to deposit and grow were removed, and furthermore improvement in the effect could be achieved.

Further, also when using any of the above high corrosion resistant metals other than titanium, to be specific, zirconium, niobium, tantalum or an alloy thereof, the same knowledge was obtained.

It has been found from such knowledges that regardless of that any of the silver or silver alloy coating treating methods is employed, the materials in which the above high corrosion resistant metal was connected to silver or a silver alloy coating via a diffusion layer and which had a high bonding strength of 0.2 MPa or more were prepared by carrying out alloying by heat diffusion treatment in which heat treatment was carried out at 450° C. or higher, preferably 550° C. or higher under a non-oxidation atmosphere after the coating treating process and that as a result thereof, peeling of the silver coating was not caused over a long period of time even under a very severe environment of seawater. Thus, the present invention has come to be completed.

There are no problems as long as silver or silver alloy has a coating thickness of 0.2 um or more obtained by the coating treatment, but from a viewpoint of the profitability and the effect, it falls preferably in a range of 1.0 to 3.0 μm.

Experiment Example 5

In this example, investigated was an effect of heat diffusion treatment against deposition of marine fouling organisms under the above non-oxidation atmosphere. First, a titanium plate of length 30 cm×width 30 cm×thickness 3 mm was dipped in an organic solvent for defatting, and then a passive film which was formed on the titanium metal surface was removed with a 5% hydrofluoric acid solution.

Next, a silver coating having a thickness of 2 μm was formed by a conventional electroplating process.

A sample which was not subjected to heat treatment (Comparative Example 6) or a sample which was subjected to heat treatment at 400° C. for one hour under an argon gas atmosphere which was a non-oxidation atmosphere (Comparative Example 7) was investigated for a degree of deposition of marine organisms.

TABLE 3

Inhibitory effect of deposition of marine fouling organisms exerted by heat diffusion treatment

| Kind of heat diffusion treatment | | Bonding strength (Mpa) | After 30 days | After 60 days | After 90 days |
|---|---|---|---|---|---|
| None | Comparative Example 6 | 0.03 | ⊚ | ○ | ○ |
| Argon gas 400° C. 1 hour | Comparative Example 7 | 0.1 | ⊚ | ⊚ | ○ |

Deposition state of marine organisms such as barnacles:
  ⊚: maintained was a state that deposition was not observed at all over the whole surface (deposition of vegetative organisms was observed, but they could be removed by simple operation)
  ○: partially observed It is apparent from the results of Table-3 that the material subjected to heat treatment in argon gas which is a non-oxidation atmosphere has a deposition-inhibiting effect as compared with the material subjected to no heat treatment.

However, in a process in which heat treatment is carried out at 400° C. for one hour in argon gas which is the above non-oxidation atmosphere, a silver coating having a large bonding strength of 0.2 MPa or more can not be obtained, and peeling of the silver coating is brought about after 90 days. As a result thereof, an improvement in the effect was not observed so much.

Further, parts of marine facilities such as ships, marine structures and the like which are brought into contact with seawater can readily be made less liable to allow marine organisms to deposit by using the marine organism deposition-preventing material of the present invention in which an adhesive or a pressure sensitive adhesive of an epoxy base and an acryl base is applied on the back thereof, and capable of being provided is a material which has no possibility of contaminating the ocean without providing maintenance over a long period of time and which not only is excellent in appearance but also has an abrasion resistance and can stably inhibit marine organisms deposition over a very long period of time.

The adhesive and the pressure sensitive adhesive used in this case shall not specifically be restricted, and those which have a good adhesive property with a chemical composition constituting an external wall of a marine arrangement such as a ship and which have a durability in seawater which is environment in use have to be optionally selected.

EXAMPLES

The marine organism deposition-preventing material according to the present invention, the production process for the same and the examples of the method for preventing marine organisms deposition when using the above material shall be explained below.

In order to completely cover a curved surface of an external wall of a ship and reduce a use amount of the above expensive high corrosion resistant metal, a material having a plate thickness of 0.06 to 1 mm was prepared by a method of roll-rolling. This sheet material was covered with silver or silver alloy by electroplating and then subjected to heat diffusion treatment under a non-oxidation atmosphere of argon gas, nitrogen gas or vacuum, followed by subjecting to smoothening processing. It was used to investigate whether or not marine organisms were inhibited from depositing.

A high corrosion resistant metal which was developed previously by the present inventors was used for a comparative example.

A method for preparing the marine organism deposition-preventing material of the present invention shall be described below in detail. First, titanium, zirconium, tantalum, niobium and titanium palladium alloy were selected as the above high corrosion resistant metal. Sheets having a thickness of 0.06 to 1 mm were prepared from these five kinds of the metal plates by roll-rolling treatment.

The titanium sheet thus prepared was dipped in an organic solvent at a room temperature for 2 to 3 hours to carry out defatting treatment for completely removing fats and oils adhering to raw materials or in rolling by roll. After this defatting treatment, the sheet was subjected to etching treatment. To specifically describe this etching treatment, the sheet was first immersed in a 5 % hydrofluoric acid solution for several minutes in order to remove a passive film which was composed of an oxide present on the titanium metal. After this etching treatment, the sheet was subjected to electroplating in a plating bath shown in Table-4.

TABLE 4

Composition of silver plating bath

| Component | Concentration (g/l) |
| --- | --- |
| Silver cyanide | 5.0 |
| Potassium cyanide | 80 |

The plating conditions were a current density of 1.0 A/dm$^2$, a plating bath temperature of 30° C., a current running time of several minutes and a silver coating thickness of about 2 µm. The material thus prepared having a plated silver thickness of 2 µm was subjected to heat treatment at 650° C. for one hour under an argon gas atmosphere to prepare a material in which a diffusion layer between silver and titanium had a thickness of 0.8 tm and a silver layer had a bonding strength of 0.42 MPa. Further, this material was smoothed by rolling with a roll to obtain a material of Example 1 of the present invention. Next, the same titanium sheet as that in Example 1 was subjected to the same defatting treatment and etching treatment as those in Example 1 and then to electroplating in a plating bath shown in Table-5 to carry out plating of a silver palladium alloy which was one example of a silver alloy.

TABLE 5

Composition of silver alloy plating bath

| Component | Concentration (g/l) |
| --- | --- |
| Silver potassium cyanide | 12 |
| Palladium chloride | 22 |
| Acid potassium pyrophosphate | 56 |
| Potassium thiocyanate | 156 |

The plating conditions were a current density of 0.5 A/dm$^2$, a plating bath temperature of 30° C., a current running time of several minutes and a silver alloy coating thickness of about 2 µm. The material thus prepared having a silver alloy thickness of 2 µm was subjected to heat treatment at 650° C. for one hour under an argon gas atmosphere which was the same heat diffusion treating method as that in Example 1 to prepare a material in which a diffusion layer between the silver alloy and titanium had a thickness of 0.8 µm and a bonding strength was 0.45 MPa. Further, this material was smoothed by rolling with a roll to prepare a material of Example 2 of the present invention.

Next, a sheet of zirconium was subjected to the same defatting, etching and electroplating treatments as those in Example 1 and then to heat treatment at 600° C. for one hour under an argon gas atmosphere to prepare a material of Example 3 of the present invention having a silver coating thickness of about 2 µm, a diffusion layer thickness of 0.5 tum and a bonding strength of 0.40 MPa.

Next, a sheet of tantalum was subjected to the same defatting, etching and electroplating treatments as those in Examples 1 and 3 and then to heat treatment at 700° C. for one hour under a high vacuum of 10$^{-6}$ torr to prepare a material having a silver coating thickness of about 2 µm, a diffusion layer thickness of 0.5 µm or less, which was difficult to measure, and a bonding strength of 0.41 MPa.

Further, this material was smoothed by rolling with a roll to prepare a material of Example 4 of the present invention.

Next, a sheet of niobium was subjected to the same defatting, etching and electroplating treatments as those in Examples 1, 3 and 4 and then to heat treatment at 700° C. for one hour under a high vacuum of $10^{-6}$ torr which was the same heat diffusion treating condition as that in Example 4 to prepare a material of Example 5 of the present invention having a silver coating thickness of about 2 μm, a diffusion layer thickness of 0.5 μm or less, which was difficult to measure, and a bonding strength of 0.40 MPa. Lastly, a sheet of a titanium palladium alloy was subjected to the same defatting, etching and electroplating treatments as those in Examples 1, 3, 4 and 5 and then to heat treatment at 600° C. for one hour under a nitrogen gas atmosphere to prepare a material having a silver coating thickness of about 2 μm, a diffusion layer thickness of 0.5 μm and a bonding strength of 0.42 MPa.

Further, this material was smoothed by rolling with a roll to prepare a material of Example 6 of the present invention.

(Enforcing Conditions)

Considering that marine organisms such as barnacles are liable to deposit from spring through early summer, an investigation period was set to 540 days starting from March up to September of the following year for the purpose of confirming the deposition-inhibiting effect over a long period of time and in order to investigate as well a change with the passage of time in the close of the old year.

A place where marine organisms such as barnacles were very liable to deposit was selected for a position where the materials were immersed.

More specifically, these samples were fixed to a raft adjacent to a quay so that the waterline was not varied as much as possible. Considering actual use in marine arrangements such as ships, the whole parts of the materials to be dipped were not immersed in the seawater and disposed so that a part of them was positioned above the sea level.

With respect to the material, the above high corrosion resistant metal plate subjected to the coating treatment described above was adhered and fixed on an FRP plate of thickness 10 mm×width 300 mm×length 500 mm with an epoxy base adhesive so that it covered the whole surface.

The following 12 kinds of samples were used for this dipping experiment:

1. Only a titanium plate was adhered and fixed (Comparative Example 8).
2. A titanium plate subjected to alloying treatment so that the titanium plate was connected to the silver coating via a diffusion layer was adhered and fixed (Example 1).
3. A titanium plate subjected to alloying treatment so that the titanium plate was connected to the silver alloy coating via a diffusion layer was adhered and fixed (Example 2).
4. Only a zirconium plate was adhered and fixed (Comparative Example 9).
5. A zirconium plate subjected to alloying treatment so that the zirconium plate was connected to the silver coating via a diffusion layer was adhered and fixed (Example 3).
6. Only a tantalum plate was adhered and fixed (Comparative Example 10).
7. A tantalum plate subjected to alloying treatment so that the tantalum plate was connected to the silver coating via a diffusion layer was adhered and fixed (Example 4).
8. Only a niobium plate was adhered and fixed (Comparative Example 11).
9. A niobium plate subjected to alloying treatment so that the niobium plate was connected to the silver coating via a diffusion layer was adhered and fixed (Example 5).
10. Only a titanium palladium alloy plate as one example of a titanium alloy was adhered and fixed (Comparative Example 12).
11. A titanium palladium alloy plate subjected to alloying treatment so that the titanium palladium alloy plate was connected to the silver coating via a diffusion layer was adhered and fixed (Example 6).
12. Only an FRP plate (Comparative Example 13).

(Results)

Shown in Table-6 were the bonding strengths between the above high corrosion resistant metals and silver or silver alloy and the presence of smoothing treatment in Examples 1 to 6 of the present invention.

A change in deposition of marine organisms with the passage of time in the 12 samples described above was as shown in Table-7.

TABLE 6

Bonding strengths in Examples 1 to 6 of the present invention

| Example | Kind of material | Bonding strength (MPa) |
|---|---|---|
| 1 | Silver-coated titanium (smoothing treatment) | 0.42 |
| 2 | Silver alloy-coated titanium (smoothing treatment) | 0.45 |
| 3 | Silver-coated zirconium (no smoothing treatment) | 0.40 |
| 4 | Silver-coated tantalum (smoothing treatment) | 0.41 |
| 5 | Silver-coated niobium (no smoothing treatment) | 0.40 |
| 6 | Silver-coated titanium palladium alloy (smoothing treatment) | 0.42 |

TABLE 7

Deposition state of marine organisms when using various materials

| Material to be coated | After 30 days | After 60 days | After 90 days | After 300 days | After 540 days |
|---|---|---|---|---|---|
| 1. Titanium | ○ | ○ | ○ | Δ | □ |
| 2. Silver-coated titanium | ⊙ | ⊙ | ⊙ | ⊙ | ⊙ |
| 3. Silver alloy-coated titanium | ⊙ | ⊙ | ⊙ | ⊙ | ⊙ |
| 4. Zirconium | ○ | ○ | ○ | Δ | □ |
| 5. Silver-coated zirconium | ⊙ | ⊙ | ⊙ | ⊙ | ⊙ |
| 6. Tantalum | ○ | ○ | ○ | Δ | □ |
| 7. Silver-coated tantalum | ⊙ | ⊙ | ⊙ | ⊙ | ⊙ |
| 8. Niobium | ○ | ○ | ○ | Δ | □ |

TABLE 7-continued

Deposition state of marine organisms when using various materials

| Material to be coated | After 30 days | After 60 days | After 90 days | After 300 days | After 540 days |
|---|---|---|---|---|---|
| 9. Silver-coated niobium | ⊚ | ⊚ | ⊚ | ⊚ | ⊚ |
| 10. Titanium palladium alloy | ○ | ○ | ○ | Δ | □ |
| 11. Silver-coated titanium palladium alloy | ⊚ | ⊚ | ⊚ | ⊚ | ⊚ |
| 12. Only FRP plate | Δ | X | X | X | X |

Deposition State of Marine Organisms such as Barnacles

⊚: maintained was a state that deposition was not observed at all over the whole surface (deposition of vegetative organisms was observed, but they could be removed by simple operation)

○: partially observed

Δ: observed over the whole surface but firm deposition on the substrate was not observed □: firm deposition on the substrate was not observed, but lamination of marine organisms caused the thickness of deposition to grow large X: observed over the whole surface, and deposition thereof was penetrated firmly into the substrate It has been confirmed from the observation results of the deposition amounts of marine organisms shown in this Table-7 that all of Examples 1 to 6 of the present invention are marine organisms deposition-inhibiting materials in which a silver coating is connected at a high bonding strength of 0.4 MPa or more, so that a phenomenon in which the silver coating is peeled off does not take place in seawater over a long period of time and which can resultingly maintain excellent effects over a very long period of time.

In this experiment, electroplating was used for a silver coating treating method, but a method optionally selected from chemical plating, a heat decomposition method and cladding can be used as long as it is a coating method in which the high bonding strength with the above high corrosion resistant metal is obtained.

To describe specific examples of actual applications of the marine organisms deposition-preventing materials of the present invention, prepared is a foil-shaped material having a coating layer of silver or silver alloy coated on the above high corrosion resistant metal at a high bonding strength of 0.2 MPa or more, wherein an adhesive or a pressure sensitive adhesive having a water resistance and a weatherability and provided with a strong bonding strength is applied on the back surface thereof, a release paper liner is disposed thereon; and it is rolled in a roll form. A simple operation in which this tape formed in a roll form is stuck on a marine arrangement such as a ship makes it possible to safely inhibit marine organisms deposition which exert very great damages and spoil good appearance without providing maintenance to the above marine arrangement over a very long period of time.

In this embodiment, an FRP plate was used for the purpose of applying the above material mainly to ships, but specific restrictions shall not be put to this FRP plate, and materials used for the above marine arrangements, such as steel, stainless and concrete can be used. A fixing method using an adhesive and a pressure sensitive adhesive has been described in this example, but a method in which the material is mechanically installed by means of bolts and nuts can be used.

As described above, the product of the present invention has been obtained by elevating rapidly the effects of the technique disclosed in Japanese Patent Application Laid-Open No. 109208/1995 and makes it possible to make use thereof as an economically excellent marine organism deposition-preventing method by using the above product for parts of the marine arrangements such as ships on which animal marine organisms such as barnacles markedly deposit in combination with the technique disclosed in Japanese Patent Application Laid-Open No. 109208/1995 which is used for parts on which marine organisms deposit in relatively small amounts.

As explained above, the marine organism deposition-preventing material of the present invention has been prepared by coating silver or silver alloy on the above high corrosion resistant metal by a production process which has not so far readily been achieved. The above marine organism deposition-preventing material has improved to a large extent, a marine organism deposition-preventing effect brought by the above single high corrosion resistant metal which was developed previously by the present inventors and inhibits marine organisms deposition without providing maintenance over a very long period of time even under a condition on which deposition of marine organisms which exerts great damages on the above marine arrangements is very liable to take place. In addition thereto, it provides an excellent effect that it does not provide at all a possibility of marine pollution.

What is claimed is:

1. A marine organism deposition-preventing material comprising a corrosion resistant metal substrate comprising titanium, zirconium, tantalum, niobium or an alloy thereof, and a coating layer of silver or silver alloy bonded to said corrosion resistant metal substrate having a bonding strength of 0.2 MPa or more.

2. The marine organism deposition-preventing material as described in claim 1, wherein said coating layer is bonded to said corrosion resistant metal substrate using an alloying treatment so that said coating layer is bonded to said corrosion resistant metal substrate via a diffusion layer.

3. The marine organism deposition-preventing material as described in claim 1, wherein the form of said material is tabular, tape-shaped, linear or reticular.

4. The marine organism deposition-preventing material as described in claim 1, wherein said corrosion resistant metal substrate has two opposed sides, one of said sides having an adhesive applied thereto, the other of said sides having said coating layer bonded thereto.

5. A process for producing the marine organism deposition-preventing material as described in claim 1, comprising:

a coating treatment in which said coating layer is coated on said corrosion resistant metal substrate, and an alloying treatment which is carried out so that said coating layer is connected to said corrosion resistant metal substrate via a diffusion layer.

6. The process for producing the marine organism deposition-preventing material as described in claim 5, wherein said alloying treatment is a heat diffusion treating method in which heat treatment is carried out at 450° C. or higher under a non-oxidation atmosphere.

7. The process for producing the marine deposition-preventing material as described in claim 5, wherein after said alloying treatment, a smoothing treatment for smoothing said coating layer is carried out.

8. A marine arrangement having installed thereon the marine organism deposition-preventing material as described in claim 1.

9. The marine arrangement as described in claim 8, wherein said marine organism deposition-preventing material is connected to the marine arrangement by means of an adhesive.

10. The marine organism deposition-preventing material as described in claim 1, which is a metal foil.

11. The marine organism deposition-preventing material as described in claim 1, wherein said corrosion resistant metal substrate has a thickness in a range of 0.06 to 3 mm.

12. The marine organism deposition-preventing material as described in claim 1, wherein said coating layer has a thickness in a range of 0.2 to 3.0 $\mu$m.

13. The marine organism deposition-preventing material as described in claim 4, wherein said adhesive is an epoxy resin or an acrylic resin.

14. The marine organism deposition-preventing material as described in claim 4, which further includes a release paper liner disposed over said adhesive.

15. The marine organism deposition-preventing material as described in claim 1, which is in the form of a roll of tape.

* * * * *